United States Patent Office 3,549,583
Patented Dec. 22, 1970

3,549,583
POLYURETHANE LIQUID CONTAINING COMPOSITIONS
Nobuyoshi Nagata, Nara-shi, and Ryuzo Mizuguchi, Osaka, Japan, assignors to Nippon Paint Co., Ltd., Osaka, Japan, a corporation of Japan
No Drawing. Filed Dec. 12, 1967, Ser. No. 689,792
Claims priority, application Japan, Dec. 14, 1966, 41/81,547
Int. Cl. C08g 51/04
U.S. Cl. 260—37         15 Claims

ABSTRACT OF THE DISCLOSURE

A coating composition comprising a copolymer consisting of one or more kinds of polymerizable unsaturated monomer components having a hydroxyl group and tertiary aliphatic group in the molecule, and one or more kinds of monoethylenic unsaturated monomer components, and a polyisocyanate compound thereto added.

A two-pack type polyurethane coating composition having an excellent flexibility, mar resistance, chemical resistance, solvent resistance and weathering resistance can be prepared by introducing a hydroxyl group and tertiary aliphatic group into a copolymer obtained from polymerizable unsaturated monomers such as acrylic ester, methacrylic ester, vinyl compound, etc., and combining a polyisocyanate compound with the resulting copolymer by means of the reactivity of the introduced hydroxyl group.

---

The present invention relates to a two-pack type coating composition comprising mainly a polymerized resin and a polyisocyanate compound.

It is well known that a two-pack type polyurethane coating material can be obtained by copolymerizing polymerizable unsaturated monomers such as acrylic esters, methacrylic esters and vinyl compounds, with a ploymerizable unsaturated monomer having a hydroxyl group, such as 2-hydroxyethyl methacrylate to introduce the hydroxyl group into the copolymer as a pendant group, and combining a polyisocyanate compound with the resulting copolymer. The coating film of the polyurethane coating material thus obtained generally has good flexibility, mar resistance, chemical resistance and solvent resistance characteristics.

However, on the other hand, the coating film of the polyurethane coating material thus obtained generally has a problem in the adhesiveness between the mutually same coating films or mutually different coating films, that is, a problem in the interlaminar adhesiveness, and further requires a large amount of expensive solvent, such as esters and ketones, when the polyurethane coating material is prepared into a paint. In evaluating the coating composition, sensual items, such as ease of paintability, gloss and surface feeling of the coating film, are of major importance. When considering these sensual characteristics, the conventional polyurethane coating material does not suffice.

It has been found that these disadvantages can be sufficiently overcome by introducing a tertiary aliphatic group into the copolymer according to the method of the present invention. By providing the coating composition of the present invention with a tertiary aliphatic group as a pendant group in the copolymer, the present coating composition can be particularly readily coated so as to form a coating whose surface is smooth, glossy and excellent in weathering resistance and durability.

In introducing the tertiary aliphatic group into the copolymer according to the present invention, the following steps are taken:

(i) Addition reaction of a carboxyl group of an α,β-ethylenic unsaturated acid being polymerizable with an epoxy group of glycidyl ester of tertiary aliphatic carboxylic acid.

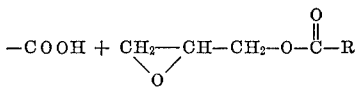

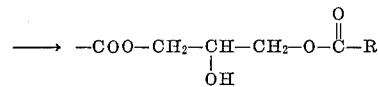

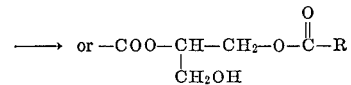

In the above formula, R is a tertiary aliphatic group (Total carbon atoms: 4–26).

(ii) Addition reaction of an epoxy group of glycidyl ester of α,β-ethylenic unsaturated acid being polymerizable with a carboxyl group of the tertiary carboxylic acid.

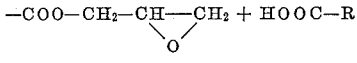

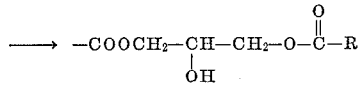

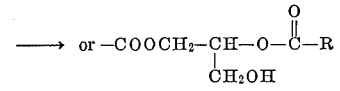

In the above formula, R is a tertiary aliphatic group (Total carbon atoms: 4–26).

These addition reactions may be conducted before, after, or during the copolymerization reaction.

That is to say, the present invention relates to a coating composition prepared by adding to (A) 100 parts by weight of a copolymer consisting of 2–50 parts by weight of an addition product component having a hydroxyl group and tertiary aliphatic group of 4–26 carbon atoms obtained by said addition reaction (i) or (ii), and 98–50 parts by weight of one or more copolymerizable unsaturated monomer components as represented by acrylic esters, methacrylic esters or styrene, (B) at least one polyisocyanate compound having two or more isocyanate groups in one molecule so that 0.2–5.0 equivalents of isocyanate group may be present with respect to the hydroxy group of the copolymer, said (A) and (B) being substantial, film-forming components.

As to a raw material for the addition product component, acrylic acid, methacrylic acid, crotonic acid itaconic acid, maleic acid, fumaric acid or monoester derivative of the dibasic acid is used as the α,β-ethylenically unsaturated acid in case of said addition reaction (i).

As a glycidyl ester having the tertiary aliphatic group, any compound having the tertiary aliphatic group of 4 to 26 total carbon atoms can be used. For example, "Cardura E" (a glycidyl ester of a synthetic tertiary carboxylic acid having the general formula

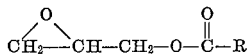

wherein R is a tertiary aliphatic hydrocarbon group of 8 through 10 carbon atoms, produced by Shell Chemical Company), glycidyl esters of "neopentanoic acid," "neoheptanoic acid," "neodecanoic acid," neotridecanoic acid" are used. In this case, the ratio by equivalent of carboxyl group to glycidyl epoxy group is preferably 1:0.5–1:2.0.

Further, in the addition reaction (ii), as a glycidyl ester of α,β-ethylenic unsaturated acid, glycidyl acrylate, glycidyl methacrylate, etc. are used. As the tertiary aliphtaic carboxylic acid, any compound having the tertiary aliphatic group of 4–26 total carbon atoms is used. For example, "Versatic Acid 9," "Versatic Acid 911," and "Versatic SRC120" (tertiary aliphatic carboxylic acids synthesized by the Reppe reaction from olefins, made by Shell Chemical Company), "neopentanoic acid," "neoheptanoic acid," "neodecanoic acid," "neotridecanoic acid," etc. are used. In this case, the ratio by equivalent of carboxylic group to glycidylepoxy group is preferably 1:0.5–1:2.0.

The 1:1 addition reaction of carboxyl group and glycidylepoxy group (i) and (ii) above can be usually attained in good yield at a temperature of 80°–160° C. for 5 minutes to 8 hours. The characteristic of the present invention can be most effectively attained when 2–50 parts by weight, preferably 5–35 parts by weight of the addition reaction product, are used with respect to 100 parts by weight of the copolymer.

As to polymerizable unsaturated monomer components capable of copolymerizing with said addition reaction product component, acrylates or methacrylates of alkanol having 1–16 carbon atoms, styrene, vinyltoluene, α-methylstyrene, acrylonitrile, methacrylonitrile, vinyl formate, vinyl acetate, vinyl butyrate, vinyl stearate, methylvinylether, ethylvinylether, etc., are used as relatively neutral monomers.

Further, in addition to these relatively neutral monomers, acrylic acid, methacrylic acid, acrylamide, or methacrylamide can be copolymerized in a lesser amount to improve the wettability between the copolymer and the pigment and the adhesiveness between the coating film and the coated material.

Further, in order to promote the cross-linking reaction between the isocyanate group and the hydroxyl group, a monomer having a tertiary amino group, for example, N,N'-dimethylaminoethyl methacrylate, N,N'-diethylaminoethyl methacrylate, etc., can be copolymerized in a lesser amount.

The present invention is aimed to obtain a cured coating film having a rigid, three-dimension cross-linked structure by the cross-linking reaction between the hydroxyl group introduced into the copolymer through the addition reaction together with the tertiary aliphatic group, and the isocyanate group, but when the degree of cross-linking is desired to be enhanced by increasing the amount of the hydroxyl group in the copolymer, a polymerizable unsaturated monomer having a hydroxyl group in the molecule, for example, 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methylol acrylamide, N-methylol methacrylamide, allyl alcohol, methallyl alcohol, crotyl alcohol, etc., can be copolymerized auxiliarily in a lesser amount.

However, one or more kinds of relatively neutral monomers as shown in the first place take a major portion in the polymerizable unsaturated monomer components capable of copolymerizing with the addition reaction product component, and the monomers other than said relatively neutral monomer take the parts by weight of less than 30 at most.

As a polymerization reaction used for preparing the copolymer from the monomers having said composition, well-known methods for polymerizing methyl methacrylate or styrene are used. Preferably, the polymerization is carried out in a solution at a temperature of 70°–160° C. in the presence of a poylmerization initiator such as peroxides or azo compounds.

The thus obtained copolymers having the tertiary aliphatic group and hydroxyl group as pendant groups are cross-linked with a polyisocyanate compound. As a polyisocyanate compound, an aliphatic or alicyclic diisocyanate such as hexamethylene diisocyanate, 2,4-diisocyanate-1-methylcyclohexane, diisocyanatocyclobutane, tetramethylene diisocyanate, o-, m- and p-xylylene diisocyanates, dicyclohexylmethane diisocyanate, dimethylcyclohexylmethane diisocyanate and the like, an aromatic polyisocyanate such as tolylene-2,4-diisocyanate, tolylene-2,6-diisocyanate, diphenylmethane-4,4'-diisocyanate, 3-methyldiphenylmethane-4,4'-diisocyanate, m- and p-phenylene diisocyanate, chlorophenylene-2,4-diisocyanate, naphtharene-1,5-diisocyanate, diphenyl-4,4'-diisocyanato-3,3'-dimethyldiphenyl, 1,3,5-triisopropylbenzene-2,4-diisocyanate, diphenylether diisocyanate and the like, and a mixture thereof are used. Further, a polyurethane polyisocyanate compound obtained by subjecting these polyisocyanate compounds in excess to reaction with a polyhydroxy compound such as ethylene glycol, diethylene glycol, neopentyl glycol, trimethylol ethane, trimethylol propane, glycerine, hexanetriol, and the like, can be also used. A polyisocyanate compound containing an isocyanurate, a polyisocyanate compound containing allophanate groups, or a polyisocyanate compound containing biuret groups can be also used. Furthermore, a polyisocyanate compound derived from a dimer acid can be also used, if desired.

These isocyanate compounds are used so that 0.2–5.0 equivalent of the isocyanate group may be present with respect to the hydroxyl group of the copolymer. If the polyisocyanate compound is used in an amount less than said equivalent, the desirable amount of cross-linking is not obtained, and further, in view of the object of the persent coating composition, it is not necessary to use the polyisocyanate compound in an amount exceeding said equivalent.

As a solvent used for preparing the copolymer of the present invention, or for preparing the present coating composition and applying the same as a paint, solvents incapable of reacting with the isocyanate group, for example, aliphatic hydrocarbons, alicyclic hydrocarbons, aromatic hydrocarbons, halogenated hydrocarbons, ethers, esters, ketones, nitriles and the like are used. More concretely, benzene, toluene, xylene, solvent naphtha, dioxane, acetonitrile, acetone, methylethylketone, methylisobutyloketone, diisopropylketone, ethylacetate, propylacetate, butylacetate ethyleneglycol monoethyletheracetate diethyleneglycol monoethyletheracetate, 3-methoxybutylacetate, and the like are often used.

Unless a clear coating film is desired, the present coating composition is colored with pigments. As a pigment, metal oxide, hydroxide, silicate, chromate, sulfide, sulfate, carbonate, various organic pigments, black, metal flake pigment, etc. are mentioned. The amount of the pigment used greatly depends upon the kind of the pigment, but preferably up to 400 parts by weight of the pigment is used with respect to 100 parts by weight of the resin solid.

The amount of the solvents to be used at the application of coating material depends upon the coating method, but the ratio by weight of the resin solid to the solvent is preferably 60:40–10:90.

The present coating composition can be applied to the material to be coated by means of spray coating, brush coating, dipping coating or roller coating, or other means. The coating film can be dried and cured by leaving the coated material at room temperature or by heating the same at a temperature less than 150° C. The rate of curing at drying can be accelerated by means of a well-known catalyst compound, such as dibutyl tin dilaurate, stannous caprylate, dimethylbenzylamine, etc.

As a suitable material to be coated with the present coating material, a metal, wood, rubber, glass, fiber, leather, and various polymer materials, etc. are used.

Referring to examples, the present invention is hereunder concretely explained, where "part" is expressed by weight.

(A) 875.00 parts of "Cardura E," 344.00 parts of methacrylic acid, 305.00 parts of xylene, and 0.18 part of hydroquinone are placed in a reactor vessel, and the temperature is increased to 140° C. under stirring. By quantitatively determining the amount of the residual carboxyl group in the system, the addition reaction between the epoxy group of "Cardura E" and the carboxyl group of methacrylic acid is traced. This addition reaction is a considerable exothermic reaction. Xylene is added to the system to prevent a sudden excessive increase in the temperature of the system, and hydroquinone is added to the system to prevent the polymerization reaction at that stage of reaction. After about 40 minutes, the addition reaction is completed, whereby a solution of the 1:1 adduct of "Cardura E" and methacrylic acid, that is, a polymerizable unsaturated monomer having the hydroxyl group and the tertiary aliphatic group in the molecule, can be obtained.

(B) 130.00 parts of neopentanoic acid, 213.00 parts of glycidyl methacrylate, 38.50 parts of ethyl acetate ester, and 0.20 part of hydroquinone are placed into a reactor vessel, and the temperature is elevated to 120° C. under stirring. The reaction is continued at that condition for 7 hours, whereby 94% of "neopentanoic acid" undergoes addition reaction with glycidyl methacrylate, and an 1:1 adduct is formed.

The foregoing examples of the addition reactions (A) and (B) are the ones where the addition reaction is conducted before the copolymerization reaction for obtaining the copolymer, but naturally said addition reaction may be carried out after the copolymerization reaction.

Examples where various copolymers are obtained using the solution of addition reaction product (A) are shown in Table 1.

xylene solution containing 80% by weight of the total sum of the addition reaction product and a very small amount of remaining methacrylic acid because methacrylic acid is added a little excessively, is used as it is (the acid number of the solution is 18). Accordingly, the amount of the addition reaction product in Table 1 shows the amount of the addition reaction product itself. Thus, when the solution of the addition reaction product obtained by (A) is used as it is, adjustment must be made by taking into consideration the amount of xylene involved therein by 20% by weight.

The polymerization method is explained hereunder, referring to Example 1. First of all, the addition reaction product obtained by the reaction (A), methyl methacrylate n-butyl acrylate, laurylmercaptane as a chain transfer agent, and xylene, ethylene glycol monoethyl ether acetate, butyl acetate ester and ethyl acetate ester as solvents are placed in a reaction vessel. Temperature is elevated under stirring, and the reactor vessel is brought into the reflux state. In that state, the polymerization reaction is carried out by trickling a solution obtained by dissolving azobisisobutyronitrile as a polymerization initiator in the asterisked solvent, that is, toluene, for a duration of two hours. After the end of trickling, refluxing and heating are further continued for two hours under stirring. The characteristic values of the resin solution thus obtained are determined by the conventional procedures.

When a clear coating film is prepared using the resin solution of examples shown in Table 1, a polyisocyanate compound is added to the resin solution obtained in examples while being stirred well so that 0.2–5.0 equivalent of the isocyanate group may be present with respect to the hydroxyl group contained in the polymerization resin solution, and the resulting coating composition is diluted to a viscosity suitable for the coating, and applied on to the material to be coated. When the colored coating film is prepared using the pigments, the pigments are added to the resin solution obtained in examples, and further a small amount of dispersing agent is thereto added if required. Then, the pigment is dispersed in the resin solution by means of a conventionally used dispersing apparatus. A polyisocyanate compound is then thereto added while being stirred well so that 0.2 to 5.0 equivalents of the isocyanate group may be present with respect to the hydroxyl group of the resin contained in the enamel, and the result-

TABLE 1

| Example Number | 1 | 2 | 3 | 4 | 5 | 6 | 7 | 8 | 9 | 10 |
|---|---|---|---|---|---|---|---|---|---|---|
| Raw material composition (parts by weight): | | | | | | | | | | |
| Addition reaction product obtained by the reaction (A) | 15.0 | 20.0 | 25.0 | 30.0 | 15.0 | 15.0 | 20.0 | 25.0 | 20.0 | 20.0 |
| Methyl methacrylate | 80.0 | 75.0 | 35.0 | 30.0 | 72.0 | 40.0 | | 40.0 | 40.0 | 30.0 |
| Styrene | | | 35.0 | 30.0 | | 32.0 | 50.0 | 25.0 | 27.0 | 25.0 |
| Ethyl acrylate | | | | 10.0 | | | 25.0 | | | 15.0 |
| n-Butyl acrylate | 5.0 | 5.0 | 5.0 | | 8.0 | 8.0 | | 5.0 | 8.0 | |
| 2-hydroxyethyl methacrylate | | | | | 5.0 | 5.0 | 5.0 | | | 10.0 |
| 2-hydroxypropyl methacrylate | | | | | | | | 5.0 | | |
| N-methylol acrylamide | | | | | | | | | 5.0 | |
| Laurylmercaptane | 0.6 | 0.6 | 0.5 | 1.2 | 0.5 | 0.7 | 0.5 | 0.5 | 1.3 | 1.3 |
| Toluene | 30.0 | 30.0 | 30.0 | 30.0 | 30.0 | 30.0 | 30.0 | 30.0 | 30.0 | 30.0 |
| Xylene | 10.0 | 10.0 | 10.0 | 20.0 | 10.0 | 20.0 | 20.0 | 20.0 | 10.0 | 20.0 |
| Ethylene glycol monoethyl ether acetate | 10.0 | 10.0 | 10.0 | 10.0 | 10.0 | 10.0 | 10.0 | 10.0 | 10.0 | 10.0 |
| Butyl acetate | 20.0 | 20.0 | 20.0 | 20.0 | 20.0 | 10.0 | 20.0 | 20.0 | 20.0 | 20.0 |
| Ethyl acetate | 30.0 | 30.0 | 20.0 | 20.0 | 30.0 | 30.0 | 20.0 | 20.0 | 30.0 | 20.0 |
| Azobisisobutyronitrile | 1.2 | 1.2 | 1.5 | 1.5 | 1.2 | 1.0 | 1.6 | 1.5 | 1.5 | 1.5 |
| Characteristic values: | | | | | | | | | | |
| Non-volatile (percent by weight) | 52.0 | 51.6 | 50.0 | 50.0 | 50.7 | 50.0 | 49.0 | 49.0 | 48.0 | 50.0 |
| Viscosity (Gardner-Holdt) | $Z_2$ | $Z_1 < Z_2$ | S | I | $Z_5$ | S | G | T | R | P |
| Amount of hydroxyl group in resin solution (percent by weight) | 0.380 | 0.507 | 0.633 | 0.760 | 0.707 | 0.707 | 0.833 | 0.927 | 0.927 | 1.159 |

There may naturally be possible a case where only the addition reaction product is isolated from the solution of the addition reaction product (A) and purified, but in the present invention, it is not necessary to use the isolated and purified addition reaction product. In other words, a ing composition is diluted to a viscosity suitable for the coating, and applied to the material to be coated, whereby a coating film can be obtained when dried.

The properties of the coating film of the coating composition using the copolymer obtained by the examples are shown in Table 2, where as an aluminum leafing type flake pigment, "Alpaste 1109A" (a trademark of a product made by Toyo Aluminum K. K.) is used; as a coloring pigment "Microbith 4GT Blue" (a trademark of a product made by Ciba Ltd.); and as a titanium dioxide, a rutile type titanium dioxide "R-820" (a trademark of a product made by Ishihara Sangyo K. K.). Further, as a polyisocyanate compound, "Desmodur N-75" (a trademark of a product made by Bayer) is used.

The testing procedures of the properties of the coating material of the coating composition thus obtained are hereunder explained:

Onto a 0.8 mm. thick steel panel applied first with an epoxy resin-modified acrylic primer is spray-coated the coating composition which is diluted to a proper viscosity with solvents, and the spray coated film is dried and cured at room temperature for 7 days or at 80° C. for 20 minutes. The thickness of the dried coating film is so adjusted that the thickness of the primer film may have about 40 microns and that of the present coating composition film may have 40 to 50 microns.

The gloss of the spray-coated film thus obtained is determined as it is by measuring the values at 60° angle of the Murakami-type gloss meter. The hardness of the coating film is determined by the pencil hardness and is expressed with the maximum grade of the hardness capable of permitting no damage thereon according to the conventional procedure. The impact resistance is determined using a 500 g. weight on a bench of ½ inch diameter of Du Pont-type impact tester. The adhesiveness is determined by providing 100 checkers of 2 mm. width on the coating film with a recording stylus, bonding an adhesive tape thereon, and vigorously stripping off the adhesive tape. When no checkered coating film is stripped off, such coating is determined OK. The gasoline resistance is evaluated by dipping the coated material into market-available high octane gasoline at room temperature for 24 hours, and observing the dissolution state of the coating film and the presence of gloss reduction. The warm water resistance is determined by immersing the coated material into city water at 40° C. for 240 hours. The ultraviolet ray resistance is determined by using two 15 w. ultra-violet ray sterilizing lamps having a major wave length of 253.7 m$\mu$ in parallel, leaving the coating film at a distance of 30 cm. from the lamps for 100 hours, and observing the appearance of the film after the irradiation (the presence of chalking and intensified yellow change phenomenon ) and measuring the values of the 60° angle gloss meter.

The properties of the present coating composition thus obtained are shown in Table 2 together with the paint composition.

What is claimed is:

1. A coating composition which comprises solvents, and as substantial, film-forming components, (A) a copolymer consisting of (1) 2-40 parts by weight of a 1:1 addition product component of a carboxyl group of an $\alpha,\beta$-ethylenically unsaturated acid and an epoxy group of a glycidal ester of a tertiary aliphatic carboxylic acid having 4-22 carbon atoms and (2) 98-50 parts by weight of at least one copolymerizable unsaturated monomer component, the total amount of (1) and (2) being 100 parts by weight, and (B) at least one polyisocyanate compound having at least two isocyanate groups in the molecule, 0.2-5.0 equivalents of the polyisocyanate compound being added thereto with respect to the hydroxy group in the copolymer.

2. A coating composition which comprises solvents, and as substantial, film-forming components, (A) a copolymer consisting of (1) 2-50 parts by weight of a 1:1 addition product component of an epoxy group of a glycidyl ester of an $\alpha,\beta$-ethylenically unsaturated acid and a carboxyl group of a tertiary aliphatic carboxylic acid having 4-22 carbon atoms, and (2) 98-50 parts by weight of at least one copolymerizable, unsaturated monomer component, the total amount of (1) and (2) being 100 parts by weight, and (B) at least one polyisocyanate compound having at least two isocyanate groups in the molecule, 0.2-5.0 equivalents of the polyisocyanate compound being added thereto with respect to the hydroxy group in the copolymer.

3. A coating composition which comprises solvents, and, as substantial, film-forming components, (A) a copolymer consisting of (1) 2-50 parts by weight of a polymerizable reaction product component having a hydroxyl group of a carboxyl group of an $\alpha,\beta$-ethylenically unsaturated acid and an epoxy group of a glycidyl ester of a tertiary aliphatic carboxylic acid having 4-22 carbon atoms, (2) 98-50 parts by weight of a copolymerizable, unsaturated monomer component, and (3) 30 or less parts by weight of at least one polymerizable, unsaturated monomer having a hydroxyl group in the molecule, the total amount of (1), (2) and (3) being 100 parts by weight, and (B) at least one polyisocyanate compound having at least two isocyanate groups in the molecule, 0.2-5.0 equivalents of the polyisocyanate compound being added with respect to the hydroxyl group in the copolymer.

4. A coating composition, which comprises solvents, and, as substantial, film-forming components, (A) a copolymer consisting of (1) 2-50 parts by weight of a polymerizable reaction product component having a hydroxyl group of an epoxy group of a glycidyl ester of an $\alpha,\beta$-ethylenically unsaturated acid and a carboxyl group of a tertiary aliphatic carboxylic acid having 4-22 carbon atoms, (2) 98-50 parts by weight of a copolymerizable, unsaturated monomer, and (3) 30 or less parts by weight

TABLE 2

| Example Number | 1 | 2 | 3 | 4 | 5 | 6 | 7 | 8 | 9 | 10 | | | | | | | | | | |
|---|---|---|---|---|---|---|---|---|---|---|---|---|---|---|---|---|---|---|---|---|
| Paint composition (parts by weight): | | | | | | | | | | | | | | | | | | | | |
| Resin solution of example | 200 | 200 | 200 | 200 | 200 | 200 | 200 | 200 | 200 | 200 | 200 | 200 | 200 | 200 | 200 | 200 | 200 | 200 | 200 | 200 |
| Rutile type titanium dioxide | 40 | | 40 | | 40 | | 40 | | 40 | | 40 | | 40 | | 40 | | 40 | | 40 | |
| Aluminum leafing type flake pigment | | 4 | | 4 | | 4 | | 4 | | 4 | | 4 | | 4 | | 4 | | 4 | | 4 |
| Blue coloring agent | | 3 | | 3 | | 3 | | 3 | | 3 | | 3 | | 3 | | 3 | | 3 | | 3 |
| Desmodur N-75 | 13 | 13 | 17 | 17 | 21 | 21 | 25 | 26 | 24 | 24 | 24 | 25 | 28 | 28 | 31 | 31 | 31 | 32 | 38 | 40 |
| Properties of coating film: | | | | | | | | | | | | | | | | | | | | |
| Value of gloss meter | 90 | 93 | 91 | 93 | 98 | 96 | 98 | 93 | 93 | 93 | 98 | 97 | 99 | 99 | 91 | 90 | 98 | 95 | 96 | 95 |
| Pencil hardness | 3H | 2H | 2H | 2H | H | H | H | H | 2H | 2H | 2H | H | H | H | H | H | H | H | H | H |
| Impact resistance strength (cm.) | 20 | 25 | 20 | 30 | 30 | 30 | 40 | 30 | 40 | 40 | 40 | 50 | 35 | 40 | 40 | 40 | 30 | 30 | 40 | 40 |
| Checker test of adhesiveness | OK | OK | OK | OK | OK | OK | OK | OK | OK | OK | OK | OK | OK | OK | OK | OK | OK | OK | OK | OK |
| Gasoline resistance | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) |
| Warm water resistance | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) |
| Ultraviolet ray resistance: | | | | | | | | | | | | | | | | | | | | |
| Appearance | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) | (¹) |
| Value of luster meter | 80 | 82 | 80 | 80 | 90 | 94 | 82 | 83 | 88 | 81 | 87 | 91 | 85 | 92 | 86 | 82 | 86 | 83 | 81 | 83 |

¹ Good.

of at least one polymerizable, unsaturated monomer having a hydroxyl group in the molecule, the total amount of (1), (2), and (3) being 100 parts by weight, and (B) at least one polyisocyanate compound having at least two isocyanate groups in the molecule, 0.2–5.0 equivalents of polyisocyanate compound being added with respect to the hydroxyl group in the copolymer.

5. A coating composition according to claim 1, wherein the $\alpha,\beta$-ethylenically unsaturated acid is at least one member selected from the group consisting of methacrylic acid, acrylic acid and crotonic acid.

6. A coating composition according to claim 1, wherein the glycidyl ester of said tertiary aliphatic carboxylic acid having the carbon atoms is a glycidyl ester of a synthetic tertiary carboxylic acid having the general formula

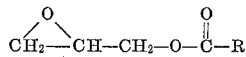

wherein R is a tertiary aliphatic hydrocarbon group of 8 to 10 carbon atoms.

7. A coating composition according to claim 2 wherein the glycidyl ester of said $\alpha,\beta$-ethylenically unsaturated acid is at least one member selected from the group consisting of glycidyl methacrylate and glycidyl acrylate.

8. A coating composition according to claim 2, wherein the tertiary aliphatic carboxylic acid having 4–22 carbon atoms is at least one member selected from the group consisting of a tertiary aliphatic carboxylic acid synthesized from olefins by the Reppe reaction, neopentanoic acid, neoheptanoic acid, and neodecanoic acid.

9. A coating composition according to claim 1, wherein the copolymerizable, unsaturated monomer component (2) is methyl methacrylate.

10. A coating composition according to claim 1, wherein the copolymerizable, unsaturated monomer component is at least one member selected from the group consisting of methyl methacrylate, styrene, vinyl toluene, and $\alpha$-methylstyrene.

11. A coating composition in accordance with claim 1 which also includes a pigment dispersed in said coating composition.

12. A coating composition in accordance with claim 2 which also includes a pigment dispersed in said coating composition.

13. A coating composition in accordance with claim 3 which also includes a pigment dispersed in said coating composition.

14. A coating composition in accordance with claim 4 which also includes a pigment dispersed in said coating composition.

15. An article of manufacture comprising a substrate and a film formed from the coating composition of claim 1.

References Cited

UNITED STATES PATENTS

| | | | |
|---|---|---|---|
| 3,028,367 | 4/1962 | O'Brien | 260—859X |
| 3,330,814 | 7/1967 | Vasta | 260—851X |
| 3,270,088 | 8/1966 | Hicks | 260—856 |

L. T. JACOBS, Assistant Examiner

MORRIS LIEBMAN, Primary Examiner

U.S. Cl. X.R.

260—859